(12) United States Patent
Lin et al.

(10) Patent No.: US 8,403,549 B2
(45) Date of Patent: Mar. 26, 2013

(54) OPTICAL DEVICE WITH LENTICULAR ARRAYS, EDGE-TYPE BACKLIGHT MODULE AND DIRECT-TYPE BACKLIGHT MODULE

(75) Inventors: Hao Xiang Lin, Taoyuan (TW); Yan Zuo Chen, Taoyuan (TW); Wen Feng Cheng, Taoyuan (TW); Jui Hsiang Chang, Taoyuan (TW)

(73) Assignee: Entire Technology Co., Ltd. (TW)

( * ) Notice: Subject to any disclaimer, the term of this patent is extended or adjusted under 35 U.S.C. 154(b) by 112 days.

(21) Appl. No.: 12/944,475

(22) Filed: Nov. 11, 2010

(65) Prior Publication Data
US 2012/0002440 A1 Jan. 5, 2012

(30) Foreign Application Priority Data

Jul. 1, 2010 (TW) .............................. 99121615 A

(51) Int. Cl.
*F21V 7/04* (2006.01)
(52) U.S. Cl. ........ 362/607; 362/606; 362/610; 362/615; 362/97.4; 362/97.2; 362/317; 362/330; 362/334
(58) Field of Classification Search .................. 362/606, 362/610, 615, 616, 617, 619, 625, 628, 629, 362/97.1–97.4, 317, 330, 334, 335, 336, 362/340; 359/409, 34, 332; 385/129, 130, 385/131
See application file for complete search history.

(56) References Cited

U.S. PATENT DOCUMENTS

| | | | | |
|---|---|---|---|---|
| 5,552,907 | A * | 9/1996 | Yokota et al. ................... | 349/62 |
| 7,440,153 | B2 * | 10/2008 | Lee et al. ......................... | 359/15 |
| 7,527,410 | B2 * | 5/2009 | Yoshizawa et al. ............ | 362/615 |
| 2004/0150874 | A1 * | 8/2004 | Suzuki .......................... | 359/332 |
| 2009/0153959 | A1 | 6/2009 | Tao et al. | |

\* cited by examiner

*Primary Examiner* — Evan Dzierzynski
*Assistant Examiner* — Danielle Allen

(57) ABSTRACT

An edge-type backlight module and a direct-type backlight module with a optical device are provided. The optical device comprises an array layer and a second refractive layer. The array layer has a first refractive index ($n_1$) and contains pluralities of lenticular lens disposed on a base surface side by side. The lenticular lens contains a curving structure with a peak, a trough, a curvature radius (R), a width (P) and an altitude (H) between the peak and the trough. The trough is disposed on the base1 surface. The array layer has a first critical angle ($\theta_{1c}$) relative to the normal of the base surface and satisfies $$\theta_{1c} = \sin^{-1}\left(\frac{1}{n_1}\right)$$

and $$H = \frac{R}{1+K}\left[1 - \sqrt{1 - (1+K)\left(\frac{P}{2R}\right)^2}\right].$$

The conical constant (K) of the lenticular lens ranges from −2.1 to −1.5. The second refractive layer is adjacent to the array layer and has a second refractive index ($n_2$) and a second critical angle ($\theta_{2c}$) relative to the normal line of the second refractive layer. The first refractive index ($n_1$) is greater than the second refractive index ($n_2$) and $$\theta_{2c} = \sin^{-1}\left(\frac{n_2}{n_1}\right)$$

is satisfied. Wherein the lenticular lens, the first critical angle ($\theta_{1c}$) and the second critical angle ($\theta_{2c}$) satisfy the equation of $$\sin^{-1}\left(\frac{1}{n_1}\right) \leq \cot^{-1}\left(\frac{H}{P/2}\right) < \sin^{-1}\left(\frac{n_2}{n_1}\right).$$

10 Claims, 11 Drawing Sheets

OPTICAL DEVICE WITH LENTICULAR ARRAYS, EDGE-TYPE BACKLIGHT MODULE AND DIRECT-TYPE BACKLIGHT MODULE

FIELD OF THE INVENTION

The present invention generally relates to lens arrays, edge-type backlight modules and direct-type backlight modules. More particularly, the present invention relates to an optical device with lenticular arrays that is used thereof in the edge-type backlight module and direct-type backlight module.

DESCRIPTION OF THE PRIOR ART

In recent years, traditional Cathode Ray Tube displays (CRT display) has gradually been replaced by Liquid Crystal Displays (LCD). This is mainly because LCDs release far less radiation than CRT displays, and further due to the significant drops in cost of LCDs in recent years. This is why LCDs have come into vogue for utilization in TV or computer display.

In general, an LCD includes a panel and a backlight module. The backlight module may be of two types: a direct-type backlight module or an edge-type backlight module, according to the size of the screen. Both of these two backlight modules may utilize and recycle whole light energy by means of its configuration, so as to prevent energy loss. A Brightness Enhancement Film (BEF) may then be utilized to focus and converge optical path, so as to increase the Gain of light intensity.

Conventionally, BEF uses a single material. According to the Fresnel equation:

$$T = 1 - R = 1 - \left[\frac{n_A - n_B}{n_A + n_B}\right]^2 = \frac{4 * n_A * n_B}{(n_A + n_B)^2},$$

the transmittance T between two connecting materials may be calculated by means of their refractive indexes $n_A$ and $n_B$, wherein R is reflective rate.

For example, a polycarbonate (PC) having a refractive index being equal to 1.586 and the air with refractive index being equal to 1.0, for instance, may have total transmittance T as:

$$T = T_1 * T_2 = \frac{4 * 1 * 1.586}{(1 + 1.586)^2} * \frac{4 * 1.586 * 1}{(1.586 + 1)^2} \approx 0.90$$

at the interface between the air and the PC. In this manner, nearly 10% of light energy from light source is lost and thus cannot be utilized. Except for the Fresnel loss due to the distinct refractive index, the microstructures in the emitting surface of the BEF may also, if in poor design, result in inefficiency refraction or reflection, so that the light energy may not be concentrated on emitting visual angle and the Gain of light intensity cannot be reinforced.

Thus, critical issues of how to increase the utilization of the light energy, reduce energy loss, and reinforce the Gain of light intensity on emitting visual angle remain and may need to be settled.

SUMMARY OF THE INVENTION

The primary objective of present invention is to increase the utilization of light energy of direct-type backlight module and edge-type backlight module, as well as reducing the Fresnel loss.

Another objective of present invention is to reinforce the Gain of light intensity on emitting visual angle of lenticular array.

To achieve the foregoing and other objectives, an optical device with lenticular arrays is provided. The optical device comprises an array layer and a second refractive layer. The array layer has a first refractive index ($n_1$) and contains pluralities of lenticular lens disposed on a base surface side by side. The lenticular lens contains a curving structure with a peak, a trough, a curvature radius (R), a width (P) and an altitude (H) between the peak and the trough. The trough is disposed on the base surface. The array layer has a first critical angle ($\theta_{1c}$) relative to the normal line of the base surface and satisfies $$\theta_{1c} = \sin^{-1}\left(\frac{1}{n_1}\right)$$

and $$H = \frac{R}{1+K}\left[1 - \sqrt{1 - (1+K)\left(\frac{P}{2R}\right)^2}\right].$$

The conical constant (K) of the lenticular lens ranges from −2.1 to −1.5. The second refractive layer is adjacent to the array layer and has a second refractive index ($n_2$) and a second critical angle ($\theta_{2c}$) relative to the normal line of the second refractive layer. The first refractive index ($n_1$) is greater than the second refractive index ($n_2$) and $$\theta_{2c} = \sin^{-1}\left(\frac{n_2}{n_1}\right)$$

is satisfied. Wherein the lenticular lens, the first critical angle ($\theta_{1c}$) and the second critical angle ($\theta_{2c}$) satisfy the equation of $$\sin^{-1}\left(\frac{1}{n_1}\right) \leq \cot^{-1}\left(\frac{H}{P/2}\right) < \sin^{-1}\left(\frac{n_2}{n_1}\right).$$

In the aforementioned optical device with lenticular arrays, wherein a first thickness ($t_1$) ranges from the base surface to the interface between the array layer and the second refractive layer, and the second refractive layer has a second thickness ($t_2$), in which the value of $t_2/t_1$ ranges from 0.035 to 0.084.

In the aforementioned optical device with lenticular arrays, wherein the conical constant (K) of the lenticular lens ranges from −2 to −1.65.

In the aforementioned optical device with lenticular arrays, wherein the value of H/P ranges from 0.42 to 0.498.

In the aforementioned optical device with lenticular arrays, wherein the array layer may be expanded to 2-Dimension or 3-Dimension structure.

In the aforementioned optical device with lenticular arrays, wherein the optical device further comprises a third refractive layer with a third refractive index ($n_3$), in which $n_3$ is smaller than $n_1$ and $n_2$.

In the aforementioned optical device with lenticular arrays, wherein the material of the array layer or the second refractive layer is polyethylene terephthalate (PET), polycarbonate (PC), tri-acetyl cellulose (TAC), polymethylmethacrylate (PMMA), methylmethacrylate styrene, polystyrene (PS) or cyclic olefin copolymer (COC).

To achieve the foregoing and other objectives, an edge-type backlight module for transmitting incident light, a first optical path and a second optical path is provided. The edge-type backlight module comprises a light source, a light guide plate, a reflective plate and an optical device with lenticular arrays. The light source may emit incident light ray. The light guide plate is disposed at one side of the light source and may receive the incident light and transmit the optical path. The reflective plate is disposed at beneath of the light guide plate. The optical device is disposed above the light guide plate to receive optical path. The optical device comprises an array layer and a second refractive layer. The array layer has a first refractive index ($n_1$) and contains pluralities of lenticular lens disposed on a base surface side by side. The lenticular lens contains a curving structure with a peak, a trough, a curvature radius (R), a width (P) and an altitude (H) between the peak and the trough. The trough is disposed on the base surface. The array layer has a first critical angle ($\theta_{1c}$) relative to the normal line of the base surface and satisfies $$\theta_{1c} = \sin^{-1}\left(\frac{1}{n_1}\right)$$

and $$H = \frac{R}{1+K}\left[1 - \sqrt{1-(1+K)\left(\frac{P}{2R}\right)^2}\right].$$

The conical constant (K) of the lenticular lens ranges from −2.1 to −1.5. The second refractive layer is adjacent to the array layer and has a second refractive index ($n_2$) and a second critical angle ($\theta_{2c}$) relative to the normal line of the second refractive layer. The first refractive index ($n_1$) is greater than the second refractive index ($n_2$) and $$\theta_{2c} = \sin^{-1}\left(\frac{n_2}{n_1}\right)$$

is satisfied. Wherein the lenticular lens, the first critical angle ($\theta_{1c}$) and the second critical angle ($\theta_{2c}$) satisfy the equation of $$\sin^{-1}\left(\frac{1}{n_1}\right) \le \cot^{-1}\left(\frac{H}{P/2}\right) < \sin^{-1}\left(\frac{n_2}{n_1}\right).$$

The first optical path is modified by means of the first critical angle ($\theta_{1c}$) and the second critical angle ($\theta_{2c}$), so that the second optical path and total reflection to the reflective plate are generated.

To achieve the foregoing and other objects, a direct-type backlight module for transmitting incident light, a first optical path and a second optical path is provided. The direct-type backlight module comprises a light source, a diffusive plate, a reflective plate and an optical device with lenticular arrays. The light source may emit incident light ray. The reflective plate is disposed at beneath of the light source. The diffusive plate is disposed above the light source and may receive the incident light and transmit the optical path. The optical device is disposed above the diffusive plate to receive optical path. The optical device comprises an array layer and a second refractive layer. The array layer has a first refractive index ($n_1$) and contains pluralities of lenticular lens disposed on a base surface side by side. The lenticular lens contains a curving structure with a peak, a trough, a curvature radius (R), a width (P) and an altitude (H) between the peak and the trough. The trough is disposed on the base surface. The array layer has a first critical angle ($\theta_{1c}$) relative to the normal line of the base surface and satisfies $$\theta_{1c} = \sin^{-1}\left(\frac{1}{n_1}\right)$$

and $$H = \frac{R}{1+K}\left[1 - \sqrt{1-(1+K)\left(\frac{P}{2R}\right)^2}\right].$$

The conical constant (K) of the lenticular lens ranges from −2.1 to −1.5. The second refractive layer is adjacent to the array layer and has a second refractive index ($n_2$) and a second critical angle ($\theta_{2c}$) relative to the normal line of the second refractive layer. The first refractive index ($n_1$) is greater than the second refractive index ($n_2$) and $$\theta_{2c} = \sin^{-1}\left(\frac{n_2}{n_1}\right)$$

is satisfied. Wherein the lenticular lens, the first critical angle ($\theta_{1c}$) and the second critical angle ($\theta_{2c}$) satisfy the equation of $$\sin^{-1}\left(\frac{1}{n_1}\right) \le \cot^{-1}\left(\frac{H}{P/2}\right) < \sin^{-1}\left(\frac{n_2}{n_1}\right).$$

The first optical path is modified by means of the first critical angle ($\theta_{1c}$) and the second critical angle ($\theta_{2c}$), so that the second optical path and total reflection to the reflective plate are generated.

Whereby, the optical device with lenticular arrays and it's application equipments, edge-type backlight module and direct-type backlight module, may reinforce the light focusing by means of two or three distinct materials with two or three distinct refractive indexes, and then may filter specific light ray. So that the light ray with greater incident angle (means deviated from normal line) may be returned to inside of the optical device or backlight module, so as to be recycled. Thus energy loss is reduced and Gain of light intensity is increased.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
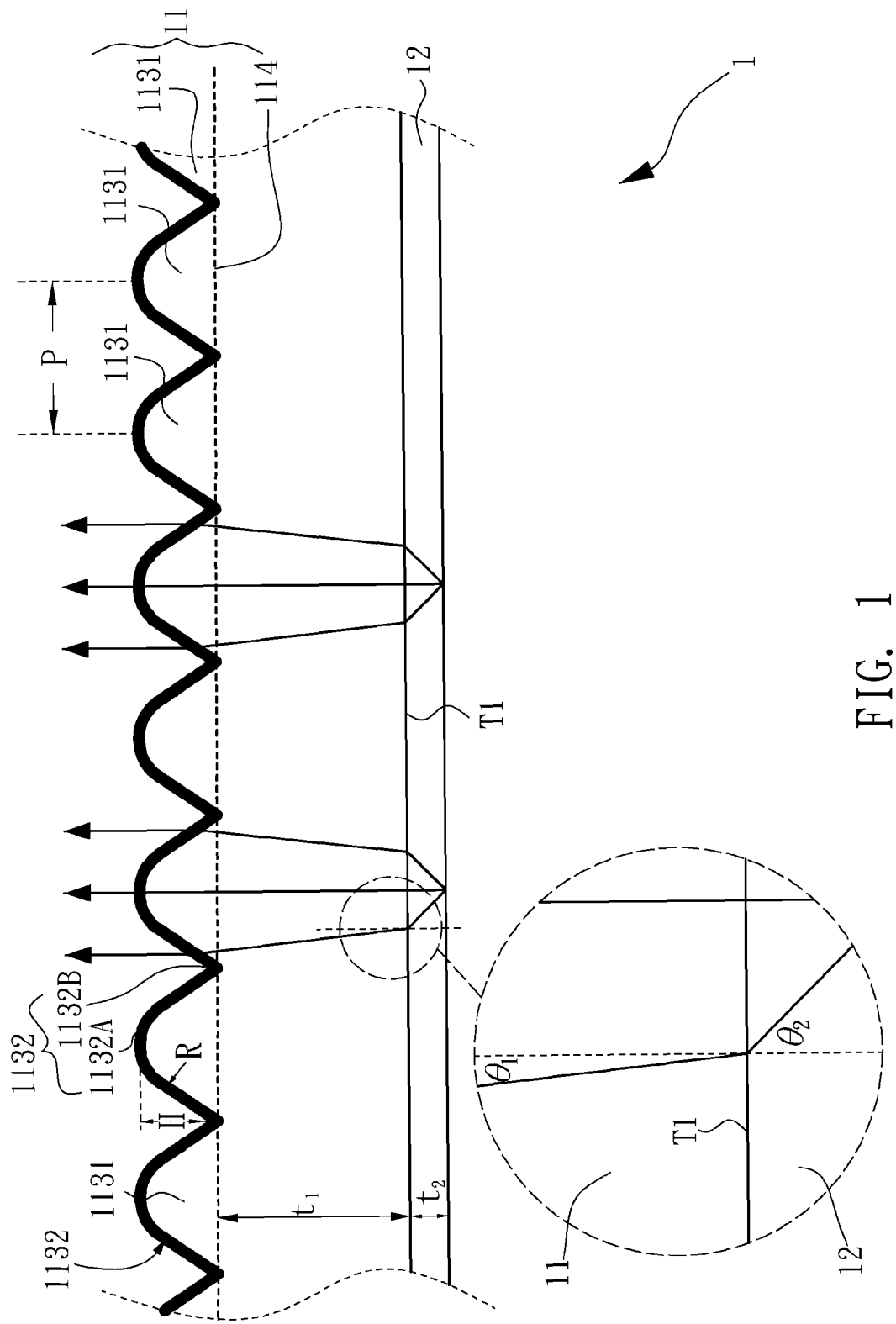
FIG. 1 is diagram of the optical device with lenticular arrays according to present invention.

Please refer now to FIG. 1, FIG. 1 is diagram of the optical device with lenticular arrays according to present invention. An optical device 1 with lenticular arrays comprises an array layer 11 and a second refractive layer 12. The interface T1 is between the array layer 11 and the second refractive layer 12. The array layer 11 includes a base surface 114 and pluralities of lenticular lenses 1131. The lenticular lenses 1131 are disposed and protruded on the base surface 114 side by side. The array layer 11 has a first refractive index $n_1$. A first thickness $t_1$ is the distance between the interface T1 and the base surface 114. Each lenticular lens 1131 contains a curving structure 1132, and the curving structure 1132 includes a peak 1132A, a trough 1132B and has curvature radius (R), width (P) and altitude (H) between the peak 1132A and the trough 1132B; wherein, the trough 1132B is disposed on the base surface 114. The second refractive layer 12 is disposed in the side of incident surface of array layer 11. The curving structure 1132 is disposed in the side of emitting surface of array layer 11. The second refractive layer 12, with second refractive index $n_2$, has a second thickness ($t_2$), wherein the second thickness ($t_2$) is distance ranging from the interface T1 to the bottom of the second refractive layer 12. As shown in FIG. 1, ray enters the optical device 1 from beneath and leaves from the top. In this manner, light ray, while inside the optical device 1 with lenticular arrays, passes through the second refractive layer 12, the array layer 11 and the curving structure 1132 in sequence, and then leaves the optical device 1. Additionally, the curving structure 1132, having hyperbola profile and conic constant (K), may satisfy the equation:

$$H = \frac{R}{1+K}\left[1 - \sqrt{1 - (1+K)\left(\frac{P}{2R}\right)^2}\right].$$

Figure 2:
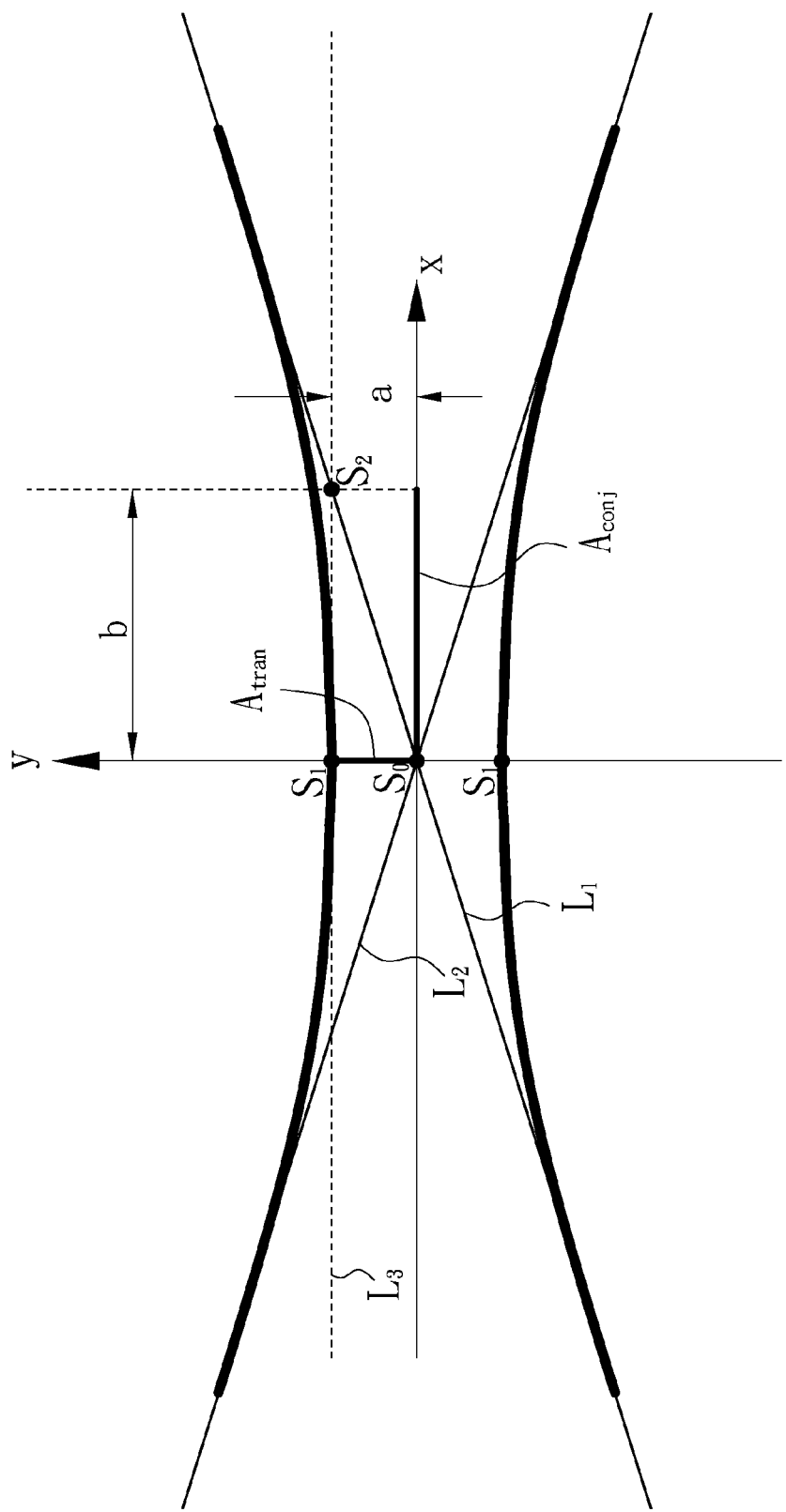
FIG. 2 is diagram of hyperbola in conic surface.

Generally, according to the definition of conic surface, a hyperbola may be defined by means of two intersecting asymptotes, one transverse axis and one conjugate axis. Please refer to FIG. 2, FIG. 2 is diagram of hyperbola in conic surface. As shown in FIG. 2, two bold-lined hyperbolas are respectively disposed at top and beneath of the asymptotes $L_1$ and $L_2$. The intersecting point of asymptote $L_1$ and $L_2$ is the origin $S_o$ of coordinates. The apexes $S_1$ of hyperbolas intersect with y-axis. The distance between the apex $S_1$ and the origin $S_o$ is semi-transverse axis $A_{tran}$, in which the value of the $A_{tran}$ is a. The apex $S_1$ defines a secant $L_3$ in horizontal direction. The secant $L_3$ intersects with the asymptote $L_1$ at an intersection point $S_2$. The distance between the intersection point $S_2$ and y-axis is semi-conjugate axis $A_{conj}$, in which the value of $A_{conj}$ is b. Moreover, according to fundamental principle of conic surface, the eccentricity (e) and the conic constant (K) of the hyperbola are:

$$e = \sqrt{\frac{a^2 - b^2}{a^2}},$$

$$K = -e^2 = \frac{b^2 - a^2}{a^2}.$$

In this manner, when the conic constant (K), the distance of semi-transverse axis $A_{tran}$ (a) and semi-conjugate axis $A_{conj}$ (b) are determined, the curve of the hyperbola is therefore confirmed.

Moreover, while comparing the hyperbola of FIG. 2 to the curving structure 1132 of FIG. 1, it may be found that the curving structure 1132, which has hyperbola profile, could be exactly determined by means of confirming the width (P), altitude (H) and conic constant (K). Besides, since profile of the curving structure 1132 is curvature-variant, the curvature radius (R) might be local curvature of the peak 1132A. In general, the conic constant (K) of the hyperbola is: K<−1.0; however, after experiment, the conic constant (K) will be preferably ranged from −2.1 to −1.5, namely: K=−2.1~−1.5.

Next, in order to prevent the upward-emitting light from total reflecting at the location of interface T1, the first refractive index $n_1$ of array layer 11 shall be greater than the second refractive index $n_2$ of the second refractive layer 12, namely, $n_1 > n_2$. According to Snell's Law: $n_1 * \sin(\theta_1) = n_2 * \sin(\theta_2)$, it is as a consequence achieved: $\theta_2 > \theta_1$. Therefore, as shown in the enlarged diagram of FIG. 1, the light emits passing through the second refractive layer 12, interface T1 and then the array layer 11, and the light may be closed to the normal line of the interface T1 after it is refracted, so that the light path may be focused and converged.

In this manner, the light may have greater incidence angle $\theta_2$ while inside the second refractive layer 12, and may approach the normal line of interface T1 after passing through the interface T1. Thus, the refractive angle $\theta_1$ is smaller than the incidence angle $\theta_2$.

Figure 3:
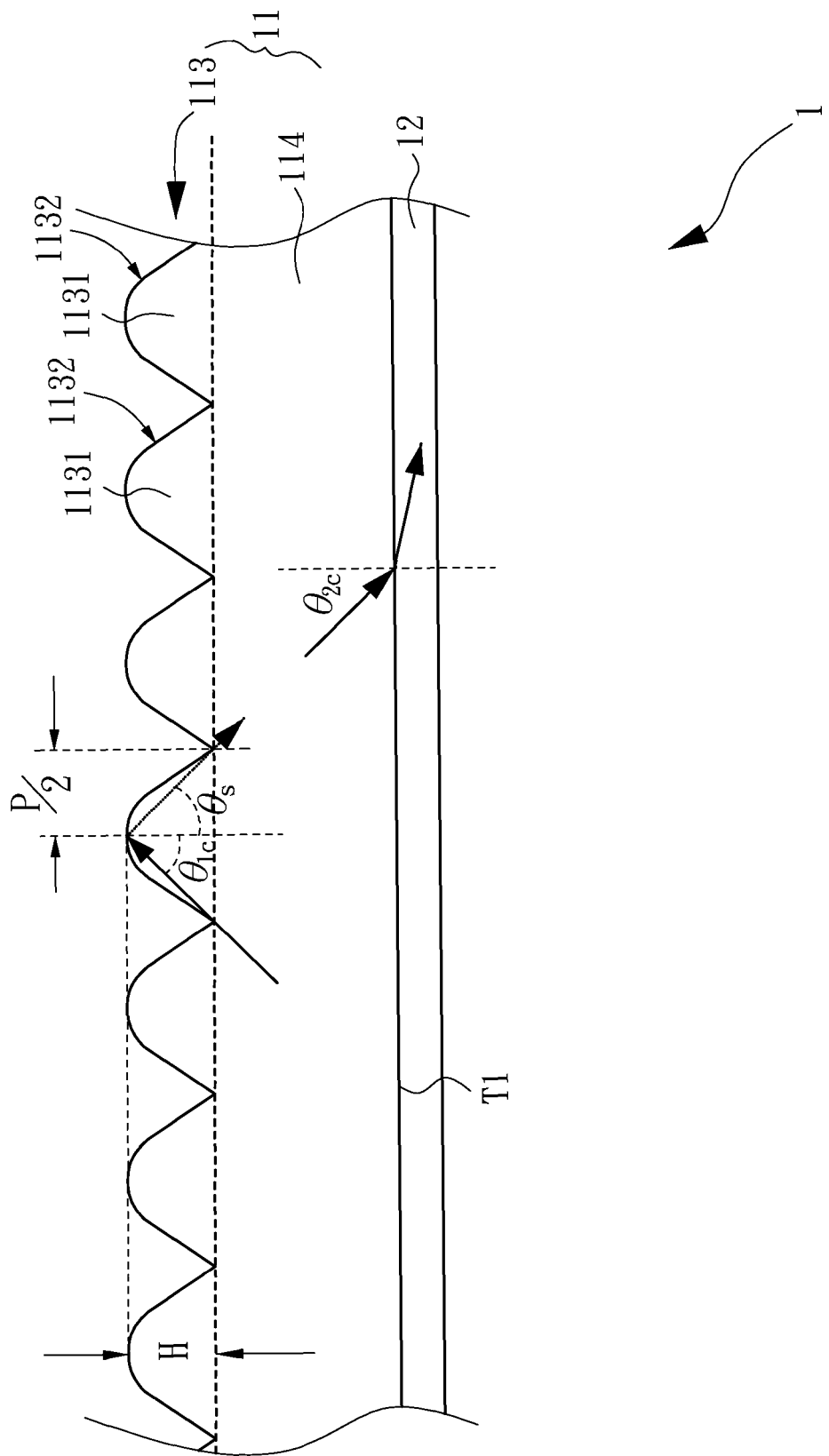
FIG. 3 is diagram of optical path of the optical device with lenticular arrays.

While considering the optical path inside the optical device 1, it may be preferable that the light is vertically emitted upward as far as possible; in the contrary, the light largely deviated from the normal line needs to be returned to the optical device 1, so as to recycle the light energy. Please refer to FIG. 3, FIG. 3 is diagram of optical path of the optical device with lenticular arrays. It is apparent that the light deviated from the normal line is rebounded, so as to recycle light energy. The lenticular lenses 1131 have first refractive index $n_1$, and the air outside the lenticular lenses 1131 has refractive index 1.0; generally, $n_1 > 1.0$. According to the Snell's Law, it may have a first critical angle $\theta_{1c}$ defined inside the array layer 11 at the local area the light leaves the curving structure 1132. While near the peak of the lenticular lens 1131, the first critical angle $\theta_{1c}$ is orthogonal to the normal line of the base surface 114 and therefore the following equation is achieved:

$$\theta_{1c} = \sin^{-1}\left(\frac{1}{n_1}\right).$$

As shown in FIG. 3, if the light inside lenticular lens 1131 having incident angle greater than the first critical angle $\theta_{1c}$, then it might be totally reflected into the interior of the optical device 1, in which the total reflected light is the first optical path. On the contrary, if the light inside the lenticular lens 1131 has an incident angle smaller than the first critical angle $\theta_{1c}$, then it may therefore emit and leave the curving structure 1132. In practice, if the light having an incident angle greater than the first critical angle $\theta_{1c}$ (too much inclined incidence) is emitted leaving the curving structure 1132, it is of no benefit for reinforcing the Gain of light intensity, particularly in the central visual angle. In consideration of utilizing light energy with efficiency, the light path which deviates from the normal line should be recycled without leaving the curving structure 1132. Thus, by taking advantage of utilizing Snell's Law, the light with greater than first critical angle $\theta_{1c}$ (too much inclined incidence) may be returned to inside of the optical device 1.

In order to totally reflect the light, which has greater incident, into inside of the optical device 1, the angle $\theta_s$ greater than the first critical angle $\theta_{1c}$ is required. Namely, the light with too much inclined incidence shall be reflected downward, so as to recycle the light energy. Wherein, the equation correlated with width (P) and altitude (H) of the curving structure 1132 may be expressed:

$$\theta_s = \cot^{-1}\left(\frac{H}{P/2}\right) \geq \sin^{-1}\left(\frac{1}{n_1}\right) = \theta_{1c} \qquad (1)$$

After the light is reflected and returned to the optical device 1, the light will make its way downward to the interface T1. According to Snell's Law, the second refractive layer 12 may define a second critical angle $\theta_{2c}$ normal to the interface T1; since the first refractive index $n_1$ of array layer 11 is greater than the second refractive index $n_2$ of second refractive layer 12, and then a specific critical angle is generated when light goes from a material with a larger refractive index to a material with a smaller refractive index. Wherein the following equation regarding $\theta_{2c}$ is achieved:

$$\theta_{2c} = \sin^{-1}\left(\frac{n_2}{n_1}\right).$$

If light going downwards to the interface T1 has an incident angle that is larger than the second critical angle $\theta_{2c}$, the light will be total reflected. In contrast, if light going downwards to the interface T1 has an incident angle that is smaller than the second critical angle $\theta_{2c}$, the light will penetrate the interface T1, so as to form a second optical path. Thus, the light in the second optical path may be recycled and re-utilized. Base on the consideration of efficiently utilizing light energy, the light had better go downward and penetrate the interface T1, so as to be recycled and re-utilized. In the similar reason as described before, the following equation may be achieved:

$$\theta_s = \cot^{-1}\left(\frac{H}{P/2}\right) < \sin^{-1}\left(\frac{n_2}{n_1}\right) = \theta_{2c} \qquad (2)$$

Then incorporate equation (1) and (2), and thus the following equation is as a result achieved:

$$\sin^{-1}\left(\frac{1}{n_1}\right) \leq \cot^{-1}\left(\frac{H}{P/2}\right) < \sin^{-1}\left(\frac{n_2}{n_1}\right).$$

In this manner, the optical device 1 may allow the light in the central visual angle (means smaller incident angle) to approach normal line, and then to emit and leave the curving structure 1132. Simultaneously, it may also allow the inclined light (means larger incident angle) to reflect and return to the optical device 1, so as to recycle and re-utilize the light energy, and as a result the Gain of light intensity may have chance to be further increased.

Except for filtering inclined angle of light, the total transmittance of the optical device 1 may be calculated by means of the Fresnel equation, in which the Fresnel equation is:

$$T = 1 - R = 1 - \left[\frac{n_A - n_B}{n_A + n_B}\right]^2 = \frac{4 * n_A * n_B}{(n_A + n_B)^2};$$

wherein T is transmittance, R is reflective ratio, and $n_A$ and $n_B$ are refractive indexes of two respective contacting materials. Thus, if the array layer 11 is polycarbonate (PC) and the second refractive layer 12 is polymethylmethacrylate (PMMA), the total transmittance T of the optical device 1 will be:

$$T = T_1 * T_2 * T_3 = \frac{4*1*1.49}{(1+1.49)^2} * \frac{4*1.49*1.586}{(1.49+1.586)^2} * \frac{4*1.586*1}{(1.586+1)^2} \approx 0.911,$$

since the refractive index of PC is 1.586, the refractive index of PMMA is 1.49 and the refractive index of air is 1.0. While comparing to the conventional Brightness Enhancement Film (BEF), it is found that the total transmittance of the optical device 1 equipped with two distinct refractive index layers may be reinforced from 0.90 to 0.911. Since the manufacturing industry has to scramble to compete on price, the slightest increase in optical performance may result in greater revenues. In fact, the total transmittance being increased from 0.90 to 0.911 is a huge breakthrough in optical technology.

Figure 4:
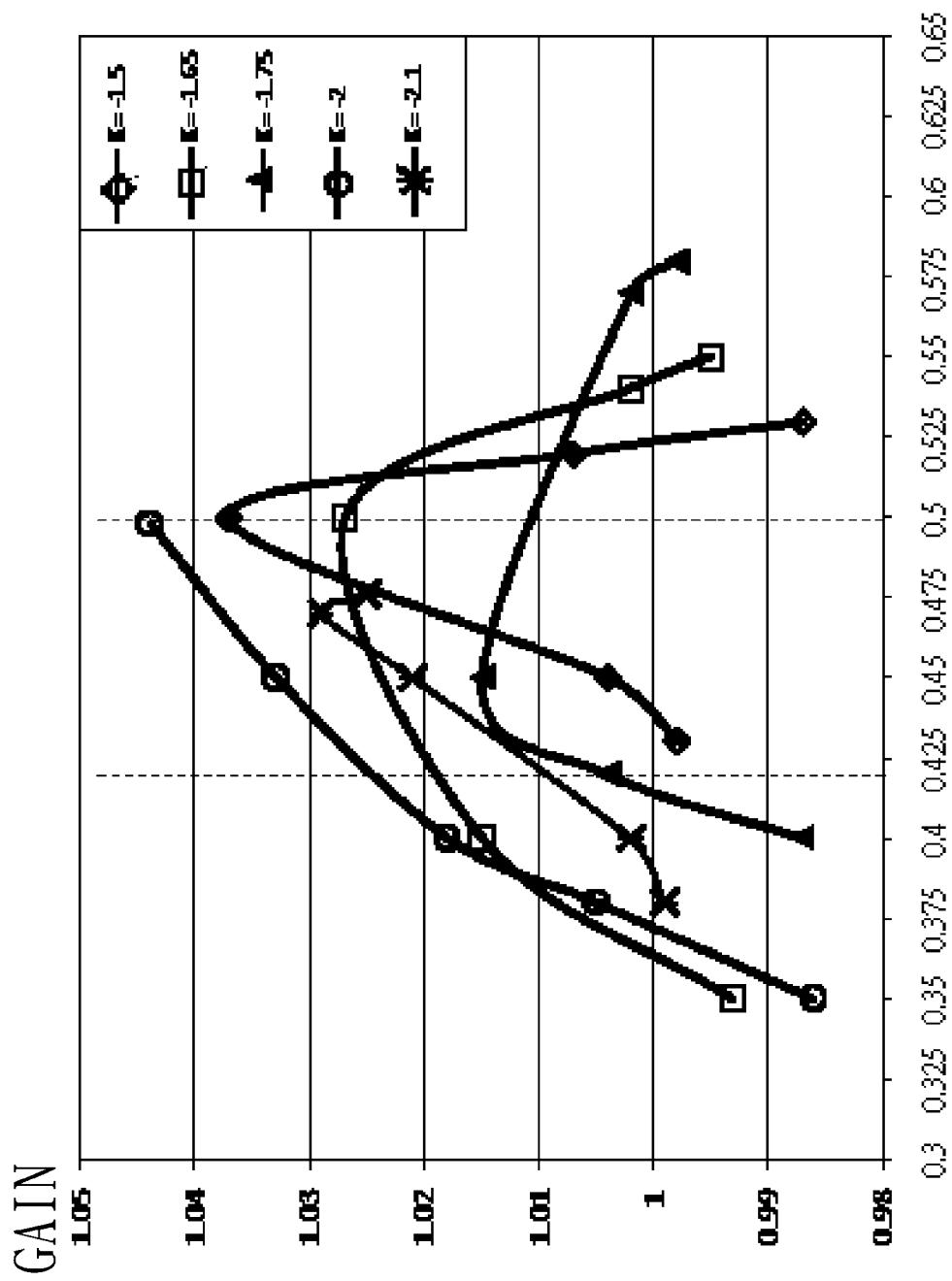
FIG. 4 is diagram of Gain of light intensity regarding the optical device with lenticular arrays in different H/P ratio.

Moreover, the optimum Gain of light intensity regarding the conic constant (K), altitude (H), width (P) of the optical device 1 is achieved by experiment, in which the material of array layer 11 is PC, the material of second refractive layer 12 is PMMA, and the conic constant (K) is −1.5, −1.65, −1.75, −2.0 and −2.1 for each sub-experiment. Please refer to FIG. 4, FIG. 4 is diagram of Gain of light intensity regarding the optical device with lenticular arrays in different H/P ratio. As shown in FIG. 4, Gain of light intensity in each sub-experiment is:

(A) K=−1.5:

Gain of light intensity is as much as 1.037 when H/P is about 0.50; namely, comparative to conventional BEF, the Gain may be further increased 3.7%;

(B) K=−1.65:

Gain of light intensity is as much as 1.027 when H/P is about 0.50; namely, comparative to conventional BEF, the Gain may be further increased 2.7%;

(C) K=−1.75:

Gain of light intensity is as much as 1.015 when H/P is about 0.45; namely, comparative to conventional BEF, the Gain may be further increased 1.5%;

(D) K=−2.0:

Gain of light intensity is as much as 1.044 when H/P is about 0.498; namely, comparative to conventional BEF, the Gain may be further increased 4.4%;

(E) K=−2.1:

Gain of light intensity is as much as 1.029 when H/P is about 0.47; namely, comparative to conventional BEF, the Gain may be further increased 2.9%.

Therefore, it is achieved that Gain of light intensity may be increased by as much as 4.4% in the previous five aforementioned sub-experiments regarding the optical device 1 of present invention, which combines two materials with distinct refractive index and equips with the curving structures 1132 by hyperbola profile, as long as H/P=0.42~0.498 is limited. It is indeed a milestone for optical development.

Figure 5:
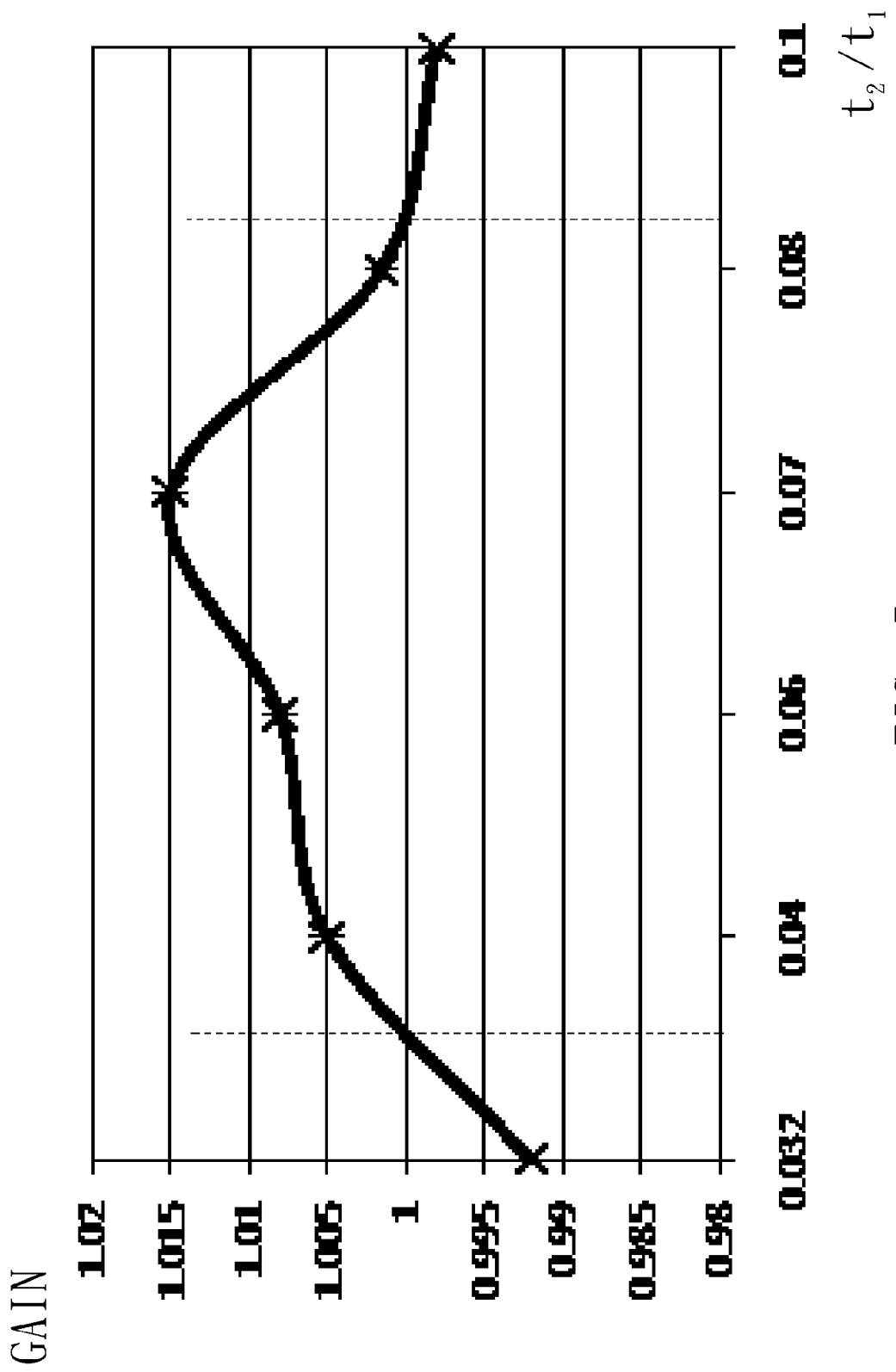
FIG. 5 is diagram of Gain of light intensity regarding the optical device with lenticular arrays in different $t_2/t_1$ ratio.

Next, the experiment of optical performance regarding thickness ratio between the array layer 11 and the second refractive layer 12, i.e. $t_2/t_1$, is also carried out, so as to achieve optimization. Please refer to FIG. 5, FIG. 5 is diagram of Gain of light intensity regarding the optical device with lenticular arrays in different $t_2/t_1$ ratio. As shown in FIG. 5, when $t_2/t_1$=0.035~0.084 is achieved, Gain of light intensity is greater than 1.0; wherein the Gain may be as much as 1.015 if $t_2/t_1$=0.07. Namely, Gain of light intensity of optical device 1 according to the present invention may have increase of 1.5% higher than conventional BEF.

Figure 6A:
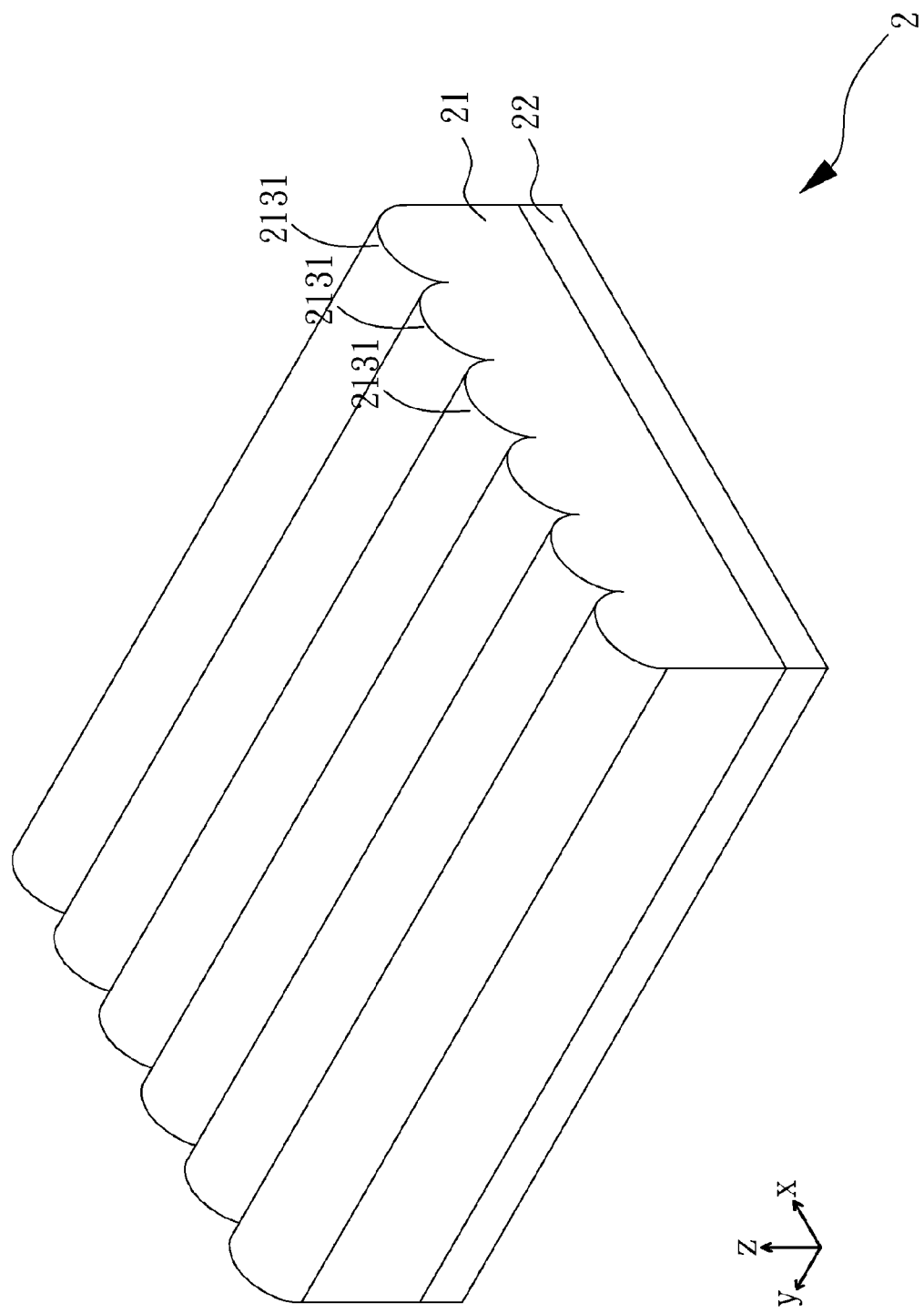
FIG. 6A is diagram of 2-Dimension structure of optical device.
Figure 6B:
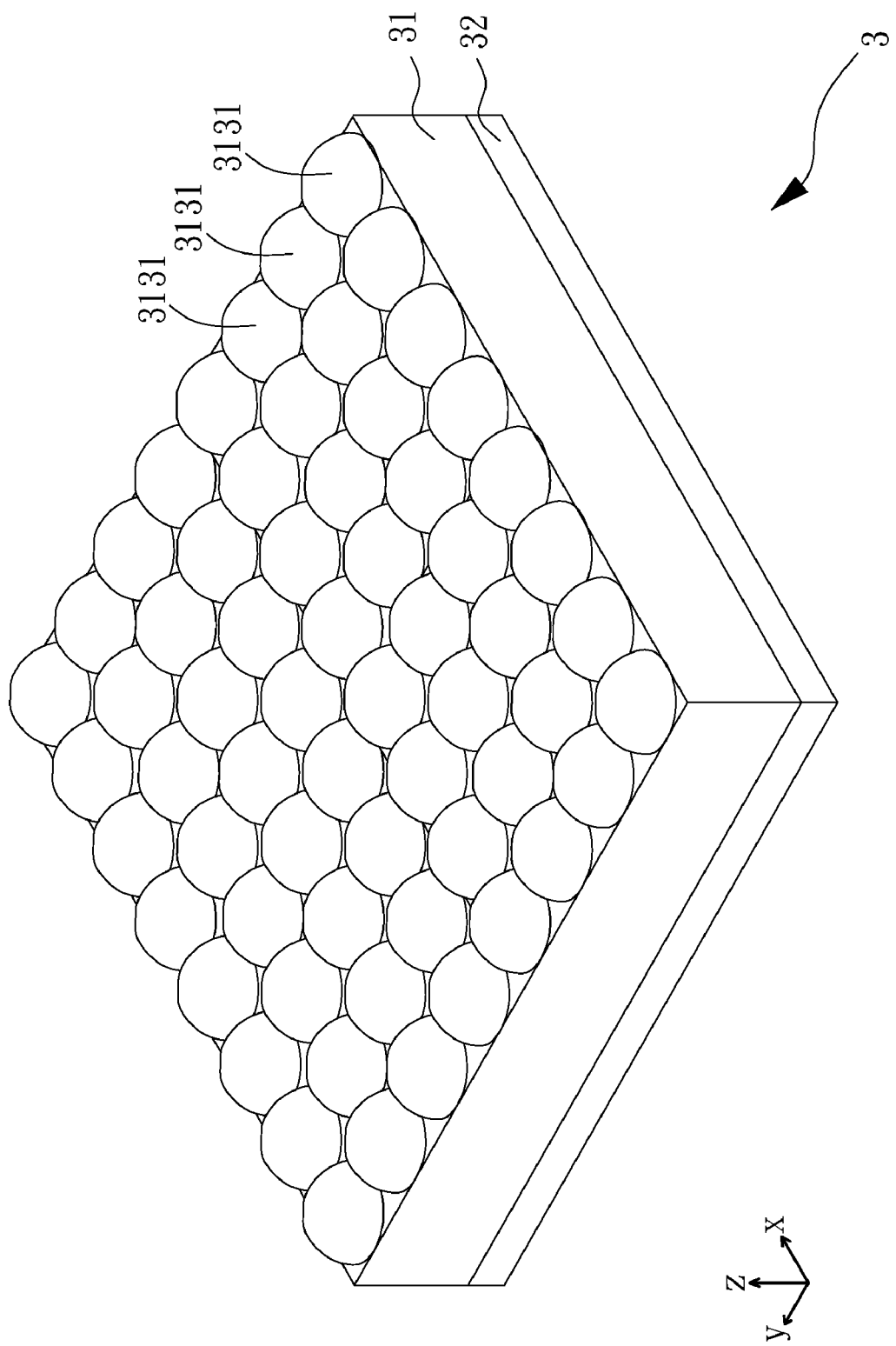
FIG. 6B is diagram of 3-Dimension structure of optical device.
Figure 6C:
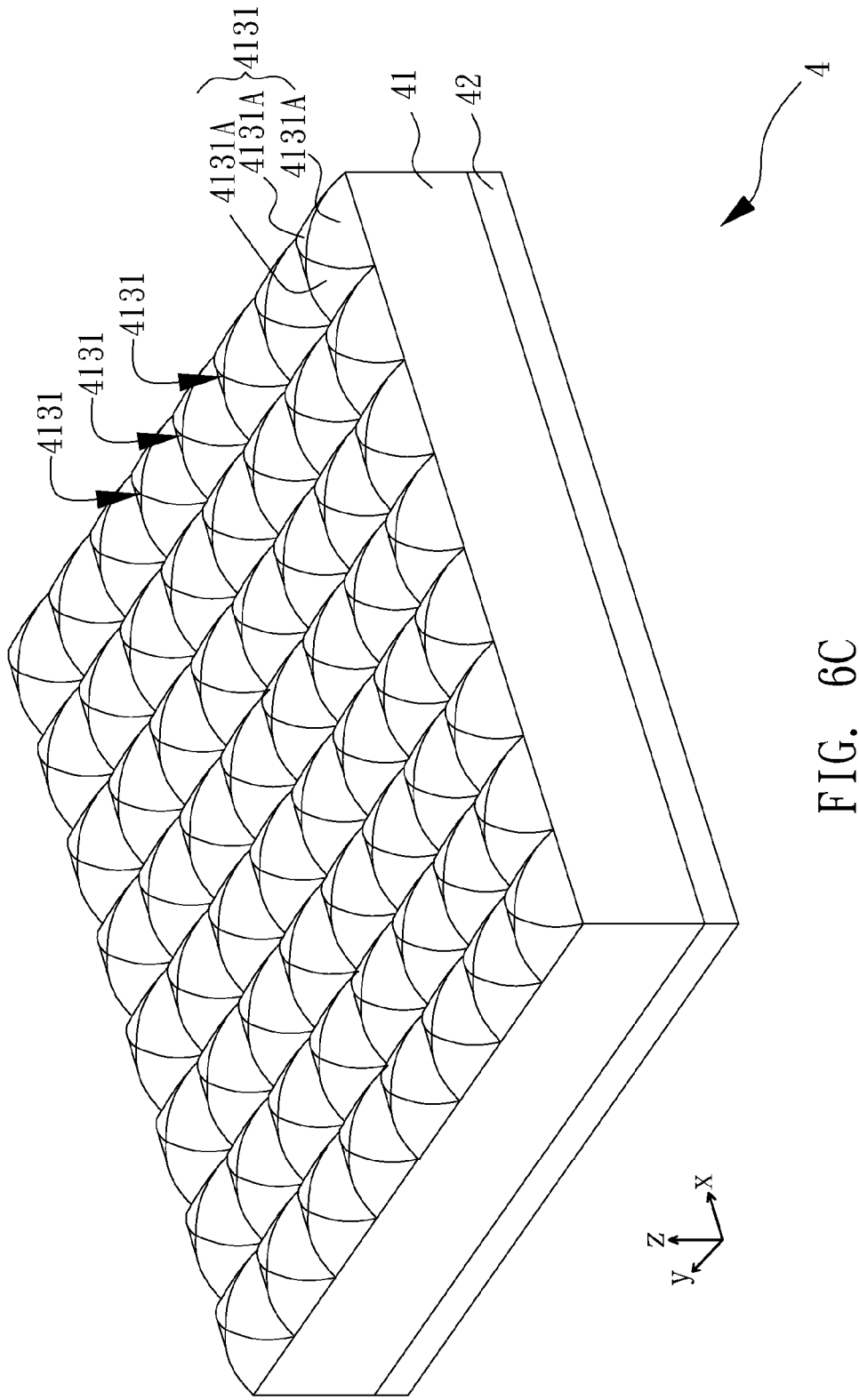
FIG. 6C is another diagram of 3-Dimension structure of optical device.

Moreover, the optical device with lenticular arrays of present invention may be configuration with 2-Dimension or 3-Dimension structure. Please refer to FIG. 6A-6C, FIG. 6A is diagram of 2-Dimension structure of optical device, FIG. 6B is diagram of 3-Dimension structure of optical device, FIG. 6C is another diagram of 3-Dimension structure of optical device. As shown in FIG. 6A, the optical device 2 comprises an array layer 21 and a second refractive layer 22. The upper side of emitting surface of the array layer 21 has pluralities of lenticular lenses 2131 disposed side by side; wherein the lenticular lenses 2131 are columns with hyperbola profile. Thus, it is apparently 2-Dimension structures. As shown in FIG. 6B, the optical device 3 comprises an array layer 31 and a second refractive layer 32. The upper side of emitting surface of the array layer 31 has pluralities of lenticular lenses 3131 disposed side by side; wherein the lenticular lenses 3131 are hemisphere with hyperbola profile. Thus, it is seen, from side view of x-z plane or y-z plane, to be 3-Dimension structures. In practice, 3-Dimension structures may have uniform and well-mixed optical effect, so as to prevent "Dark Belt"; since "Dark Belt" has unacceptably brightness and darkness alternating. Besides, as shown in FIG. 6C, the optical device 4 comprises an array layer 41 and a second refractive layer 42. The upper side of emitting surface of the array layer 41 has pluralities of lenticular lenses 4131 disposed side by side; wherein each lenticular lens 4131 is composed of four composite faces 4131A, and has hyperbola profile seen from side view of x-z plane or y-z plane.

Figure 7:
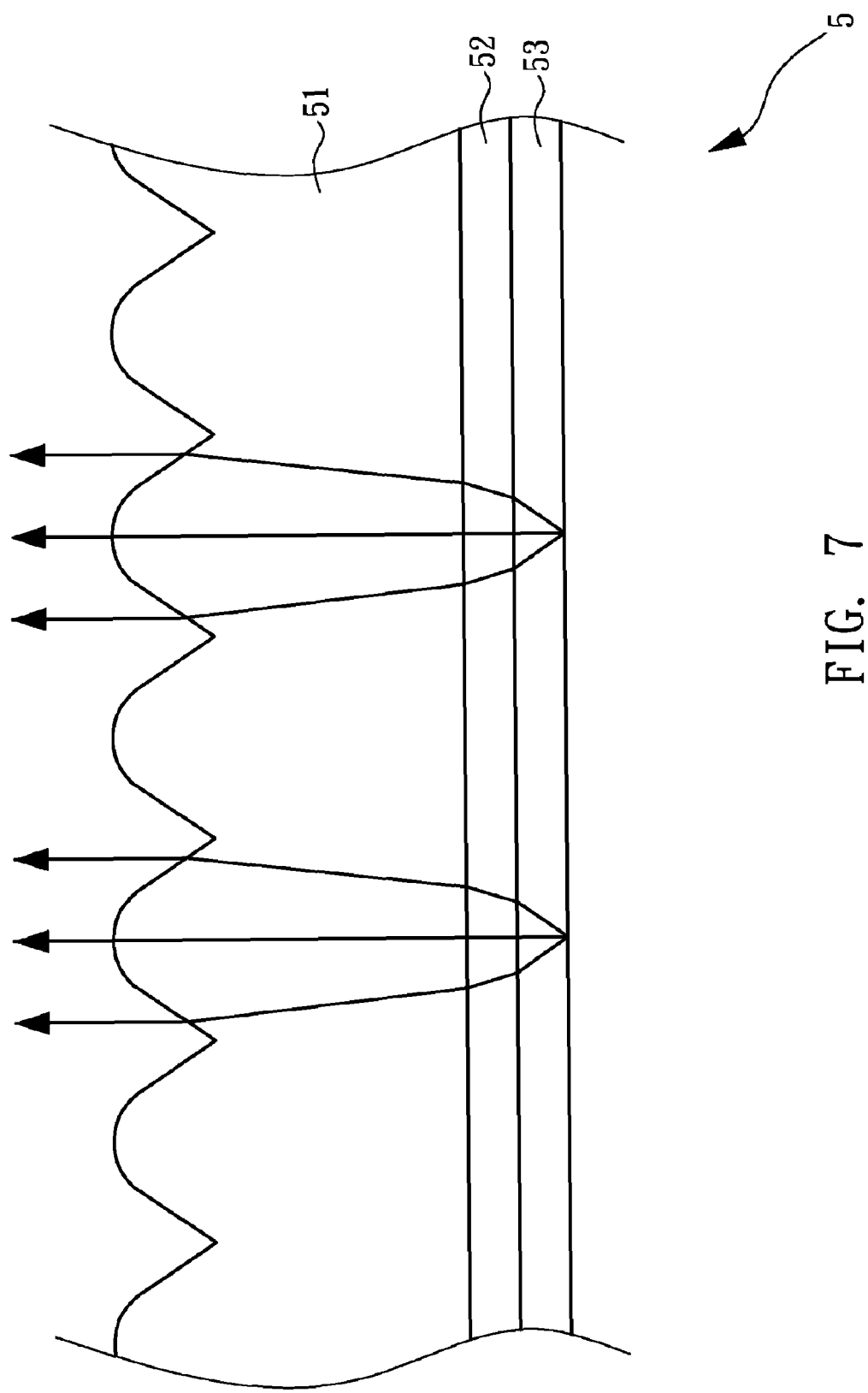
FIG. 7 is diagram of the optical device with lenticular arrays according to another embodiment.

Additionally, the optical device according to present invention may contain three distinct materials. Please refer to FIG. 7, FIG. 7 is diagram of the optical device with lenticular arrays according to another embodiment. As shown in FIG. 7, the optical device 5 comprises an array layer 51, a second refractive layer 52 and a third refractive layer 53, in which their refractive indexes are $n_1$, $n_2$ and $n_3$ respectively, and $n_1>n_2>n_3$. Namely, the layer closer to the emitting surface of the optical device 5 may have greater refractive index than further layer. In this manner, the light may be more and more approaching normal line and as a result has benefit of focusing when the light is emitted upward, by means of refractive index difference between those materials. Similarly, the total transmittance of optical device 5 is also calculated by means of Fresnel equation. The materials of the array layer 51, second refractive layer 52 and the third refractive layer 53 are PC, M.S. plastic and PMMA respectively, in which their refractive indexes are $n_1$=1.586, $n_2$=1.56 and $n_3$=1.49. According to Fresnel equation:

$$T = T_1 * T_2 * T_3 * T_4 = \frac{4*1*1.49}{(1+1.49)^2} * \frac{4*1.49*1.56}{(1.49+1.56)^2} * \frac{4*1.56*1.586}{(1.56+1.586)^2} * \frac{4*1.586*1}{(1.586+1)} \approx 0.911,$$

it is apparently that total transmittance is about 91.1%, which is approximately the same with previous embodiment of FIG. 1.

In a preferable embodiment, the material of array layer, second refractive layer or third refractive layer might be Polyethylene Terephthalate (PET), Tri-acetyl Cellulose (TAC), Methylmethacrylate styrene, Polystyrene (PS) or Cyclic Olefin Copolymer (COC), so as to diversify it combination, as long as that the layer closer to emitting surface has greater refractive index than further layer's.

Figure 8:
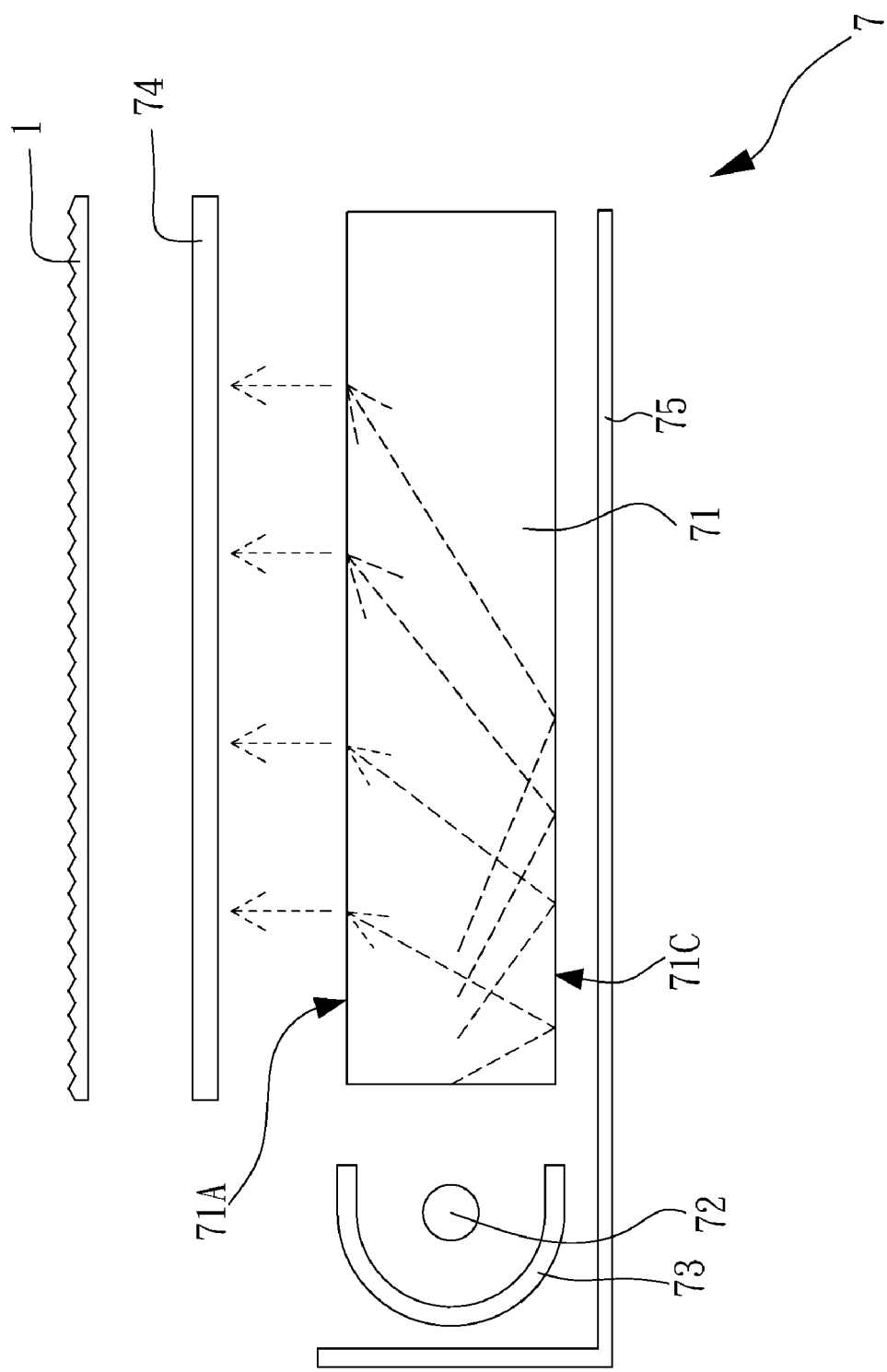
FIG. 8 is diagram of edge-type backlight module utilizing the optical device.

The optical device introduced before may be utilized in both edge-type backlight module and direct-type backlight module. Please refer to FIG. 8, FIG. 8 is diagram of edge-type backlight module utilizing the optical device with lenticular arrays. As shown in FIG. 8, an edge-type backlight module 7 comprises a light guide plate 71, a light source 72, a cover 73, a diffusive film 74, a reflective plate 75 and a optical device 1 as introduced before. The light source 72 may emit light ray. The emitting surface 71A and bottom surface 71C of the light guide plate 71 are disposed at corresponding two opposite faces. The light source 72 is disposed at left side of the light guide plate 71. Light ray may be, after emitted from the light source 72, reflected by the cover 73 and then enter inside of the light guide plate 71. In this manner, the light guide plate 71 may transmit the incident light so as to form a well-mixed optical path. The optical device 1 is located at side of emitting surface 71A of the light guide plate 71. The diffusive film 74 is located between the light guide plate 71 and optical device 1. The reflective plate 75 is located at outer side of bottom surface 71C of the light guide plate 71. In preferable embodiment, the light source 72 might be Cold Cathode Fluorescent Lamp (CCFL), Light Emitting Diode (LED) or other luminous body. In this manner, the optical path of the optical device 1 could be modified by means of the first critical angle $\theta_{1c}$ and the second critical angle $\theta_{2c}$ as previously described. Therefore the light ray inside the optical device 1 could be total reflected downward, so as to reach the reflective plate 75 and become the second optical path. Thus the edge-type backlight module 7 may reduce the transmitting loss and reinforce Gain of light intensity.

Figure 9:
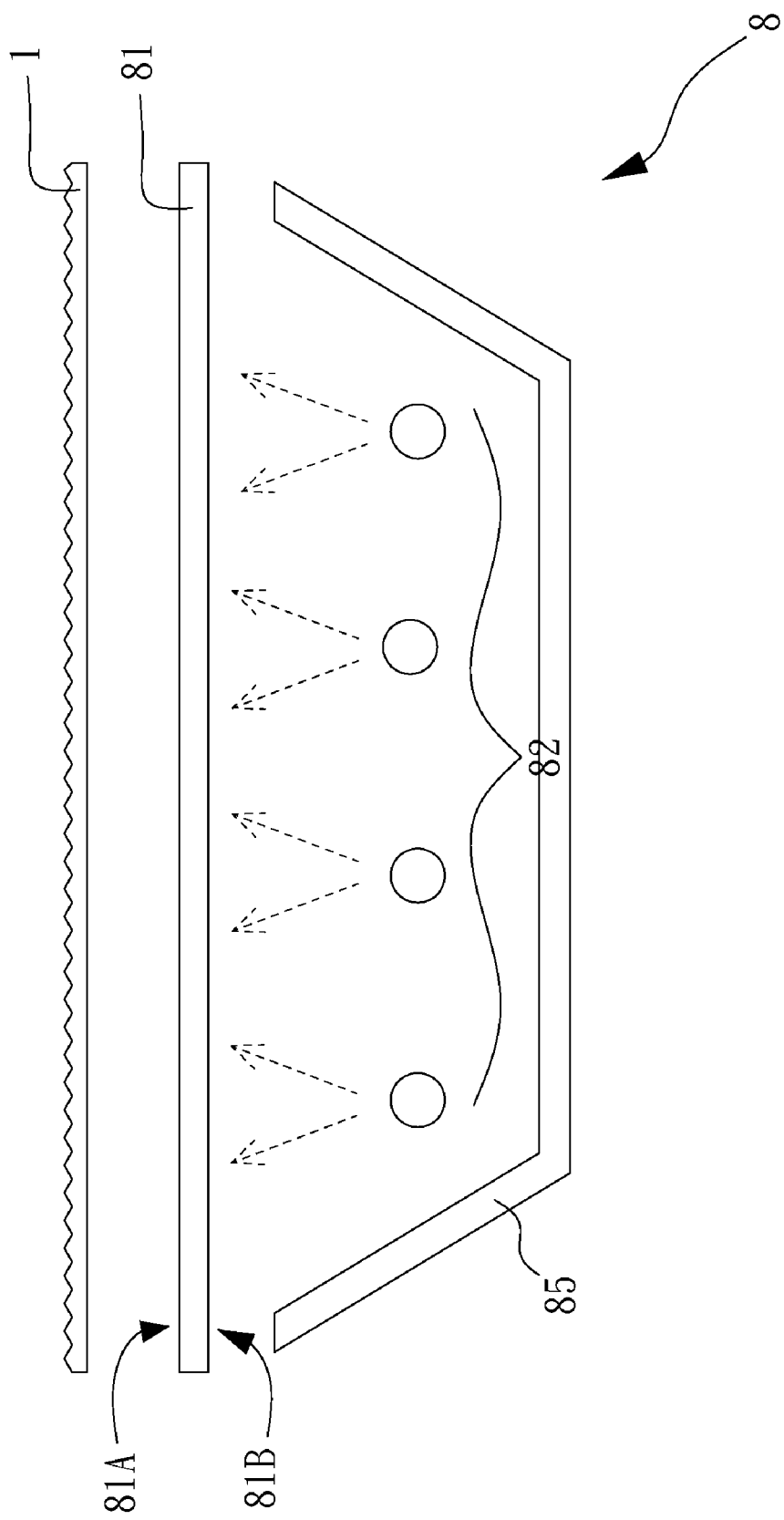
FIG. 9 is diagram of direct-type backlight module utilizing the optical device.

Please refer to FIG. 9, FIG. 9 is diagram of direct-type backlight module utilizing the optical device. As shown in FIG. 9, a direct-type backlight module 8 comprises a diffusive plate 81, a light source 82, a reflective plate 85 and an optical device 1 introduced in FIG. 1. The light source 82 could emit incident light ray. The diffusive plate 81 may transmit and scatter the light ray, so as to form optical path. The emitting surface 81A and incident surface 81B are located at corresponding two opposite faces of the diffusive plate 81. The reflective plate 85 is disposed at outer side of incident surface 81B. The light source 82 is disposed between the diffusive plate 81 and the reflective plate 85, so that the light ray may be projected into the diffusive plate 81. The optical device 1 is disposed at side of emitting surface 81A. In this embodiment, the light source 82 could be pluralities of CCFL or LED bars. Thus the optical path of the optical device 1 could be modified by means of the first critical angle $\theta_{1c}$ and the second critical angle $\theta_{2c}$ as previously described. Therefore the light ray inside the optical device 1 could be total reflected downward, so as to reach the reflective plate 85 and become the second optical path. Thus the direct-type backlight module 8 may reduce the transmitting loss and reinforce Gain of light intensity.

Summarily, the optical device with lenticular arrays and it's application equipments, edge-type backlight module and direct-type backlight module, may reinforce the light focusing by means of two or three distinct materials with two or three distinct refractive indexes, and then may filter specific light ray, so that the light ray with greater incident angle (means deviated from normal line) may be returned to inside of the optical device or backlight module, so as to be recycled. Thus energy loss is reduced and Gain of light intensity is increased.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

We claim:

1. An optical device with lenticular arrays, comprising:

an array layer having a first refractive index ($n_1$) and comprising pluralities of lenticular lenses disposed on a base surface side by side, each of the lenticular lenses containing a curving structure with a peak, a trough, a curvature radius (R), a width (P) and an altitude (H) between the peak and the trough, the trough being disposed on the base surface, the array layer having a first critical angle ($\theta_{1c}$) relative to the normal line of the base surface and satisfying $$\theta_{1c} = \sin^{-1}\left(\frac{1}{n_1}\right)$$

and $$H = \frac{R}{1+K}\left[1 - \sqrt{1 - (1+K)\left(\frac{P}{2R}\right)^2}\right],$$

the conical constant (K) of the lenticular lens ranging from −2.1 to −1.5;

a second refractive layer being adjacent to the array layer and having a second refractive index ($n_2$) and a second critical angle ($\theta_{2c}$) relative to the normal line of the second refractive layer, the first refractive index ($n_1$) being greater than the second refractive index ($n_2$) and $$\theta_{2c} = \sin^{-1}\left(\frac{n_2}{n_1}\right)$$

being satisfied;

wherein the lenticular lens, the first critical angle ($\theta_{1c}$) and the second critical angle ($\theta_{2c}$) satisfy the equation of $$\sin^{-1}\left(\frac{1}{n_1}\right) \leq \cot^{-1}\left(\frac{H}{P/2}\right) < \sin^{-1}\left(\frac{n_2}{n_1}\right).$$

2. The optical device with lenticular arrays as claim 1, wherein a first thickness ($t_1$) ranges from the base surface to the interface between the array layer and the second refractive layer, and the second refractive layer has a second thickness ($t_2$), in which the value of $t_2/t_1$ ranges from 0.035 to 0.084.

3. The optical device with lenticular arrays as claim 1, wherein the conical constant (K) of the lenticular lens ranges from −2 to −1.65.

4. The optical device with lenticular arrays as claim 1, wherein the value of H/P ranges from 0.42 to 0.498.

5. The optical device with lenticular arrays as claim 1, wherein the array layer is expanded to 2-Dimension.

6. The optical device with lenticular arrays as claim 1, wherein the array layer is expanded to 3-Dimension.

7. The optical device with lenticular arrays as claim 1, wherein the optical device further comprises a third refractive layer with a third refractive index ($n_3$), in which $n_3$ is smaller than $n_1$ and $n_2$.

8. The optical device with lenticular arrays as claim 1, wherein the material of the array layer or the second refractive layer is polyethylene terephthalate (PET), polycarbonate (PC), tri-acetyl cellulose (TAC), polymethylmethacrylate (PMMA), methylmethacrylate styrene, polystyrene (PS) or cyclic olefin copolymer (COC).

9. An edge-type backlight module for transmitting an incident light, a first optical path and a second optical path, comprising:

a light source for emitting the incident light;

a light guide plate disposed at one side of the light source and receiving the incident light and transmitting the optical path;

a reflective plate disposed at beneath of the light guide plate;

an optical device with lenticular arrays disposed above the light guide plate to receive optical path, and having an array layer containing a first refractive index ($n_1$) and comprising pluralities of lenticular lenses disposed on a base surface side by side, each of the lenticular lenses containing a curving structure with a peak, a trough, a curvature radius (R), a width (P) and an altitude (H) between the peak and the trough, the trough being disposed on the base surface, the array layer having a first critical angle ($\theta_{1c}$) relative to the normal line of the base surface and satisfying $$\theta_{1c} = \sin^{-1}\left(\frac{1}{n_1}\right)$$

and $$H = \frac{R}{1+K}\left[1 - \sqrt{1-(1+K)\left(\frac{P}{2R}\right)^2}\,\right],$$

the conical constant (K) of the lenticular lens ranging from $-2.1$ to $-1.5$;
    a second refractive layer being adjacent to the array layer and having a second refractive index ($n_2$) and a second critical angle ($\theta_{2c}$) relative to the normal line of the second refractive layer, the first refractive index ($n_1$) being greater than the second refractive index ($n_2$) and $$\theta_{2c} = \sin^{-1}\left(\frac{n_2}{n_1}\right)$$

being satisfied;
    wherein the lenticular lens, the first critical angle ($\theta_{1c}$) and the second critical angle ($\theta_{2c}$) satisfy the equation of $$\sin^{-1}\left(\frac{1}{n_1}\right) \leq \cot^{-1}\left(\frac{H}{P/2}\right) < \sin^{-1}\left(\frac{n_2}{n_1}\right),$$

and the first optical path is modified by means of the first critical angle ($\theta_{1c}$) and the second critical angle ($\theta_{2c}$) so that the second optical path and total reflection to the reflective plate are generated.

10. A direct-type backlight module for transmitting a incident light, a first optical path and a second optical path, comprising:
    a light source for emitting the incident light;
    a reflective plate disposed at beneath of the light source;
    a diffusive plate disposed above the light source and receiving the incident light and transmitting the optical path;
    an optical device with lenticular arrays disposing above the diffusive plate to receive optical path, and having an array layer containing a first refractive index ($n_1$) and comprising pluralities of lenticular lenses disposed on a base surface side by side, each of the lenticular lenses containing a curving structure with a peak, a trough, a curvature radius (R), a width (P) and an altitude (H) between the peak and the trough, the trough being disposed on the base surface, the array layer having a first critical angle ($\theta_{1c}$) relative to the normal line of the base surface and satisfying $$\theta_{1c} = \sin^{-1}\left(\frac{1}{n_1}\right)$$

and $$H = \frac{R}{1+K}\left[1 - \sqrt{1-(1+K)\left(\frac{P}{2R}\right)^2}\,\right],$$

the conical constant (K) of the lenticular lens ranging from $-2.1$ to $-1.5$;
    a second refractive layer being adjacent to the array layer and having a second refractive index ($n_2$) and a second critical angle ($\theta_{2c}$) relative to the normal line of the second refractive layer, the first refractive index ($n_1$) being greater than the second refractive index ($n_2$) and $$\theta_{2c} = \sin^{-1}\left(\frac{n_2}{n_1}\right)$$

being satisfied;
    wherein the lenticular lens, the first critical angle ($\theta_{1c}$) and the second critical angle ($\theta_{2c}$) satisfy the equation of $$\sin^{-1}\left(\frac{1}{n_1}\right) \leq \cot^{-1}\left(\frac{H}{P/2}\right) < \sin^{-1}\left(\frac{n_2}{n_1}\right),$$

and the first optical path is modified by means of the first critical angle ($\theta_{1c}$) and the second critical angle ($\theta_{2c}$) so that the second optical path and total reflection to the reflective plate are generated.

\* \* \* \* \*